(12) United States Patent
Nudelman

(10) Patent No.: US 7,275,896 B2
(45) Date of Patent: Oct. 2, 2007

(54) GROOVING CUTTING INSERT HAVING A CIRCULAR CUTTING EDGE PROVIDED WITH RELIEF RECESSES

(75) Inventor: Robi Nudelman, Karmiel (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/531,420

(22) Filed: Sep. 13, 2006

(65) Prior Publication Data

US 2007/0059112 A1    Mar. 15, 2007

(30) Foreign Application Priority Data

Sep. 13, 2005    (IL) ..................................... 170837

(51) Int. Cl.
*B23B 27/22* (2006.01)
(52) U.S. Cl. ...................... 407/114; 407/113; 407/117; 407/115
(58) Field of Classification Search ........ 407/113–117; B23B 27/22
See application file for complete search history.

(56) References Cited

U.S. PATENT DOCUMENTS

| 3,460,409 | A | * | 8/1969 | Stokey ...................... 407/115 |
| 3,574,911 | A | | 4/1971 | Penoyar |
| 3,636,602 | A | | 1/1972 | Owen |
| 3,705,447 | A | | 12/1972 | Kollar |
| 3,922,766 | A | | 12/1975 | Malinchak |
| 4,115,024 | A | * | 9/1978 | Sussmuth ................... 407/114 |
| 4,681,486 | A | * | 7/1987 | Hale .......................... 407/114 |
| 4,844,668 | A | | 7/1989 | Pettersson |
| 4,936,714 | A | | 6/1990 | Demircan |
| 4,992,007 | A | * | 2/1991 | Satran ........................ 407/110 |
| 5,205,680 | A | | 4/1993 | Lindstedt |
| 5,342,151 | A | | 8/1994 | Friedmann |
| 5,439,327 | A | * | 8/1995 | Wertheim ..................... 407/11 |
| 5,660,507 | A | * | 8/1997 | Paya .......................... 407/114 |
| 5,779,401 | A | * | 7/1998 | Stallwitz et al. ............ 407/114 |
| 6,685,402 | B2 | * | 2/2004 | Mast et al. .................. 408/227 |
| 6,692,199 | B2 | * | 2/2004 | Andersson et al. ......... 407/116 |
| 6,715,968 | B1 | * | 4/2004 | Tagtstrom et al. .......... 407/116 |
| 6,796,752 | B2 | | 9/2004 | Tong |
| 7,008,145 | B2 | | 3/2006 | Astrakhan |
| 2005/0019110 | A1 | | 1/2005 | Astrakhan |
| 2005/0180825 | A1 | * | 8/2005 | Maier et al. ................ 407/113 |

FOREIGN PATENT DOCUMENTS

DE    1950037    4/1971
EP    0955116    11/1999

OTHER PUBLICATIONS

International Search Report, PCT/IL2006/001012, dated Dec. 28, 2006.

\* cited by examiner

*Primary Examiner*—Monica Carter
*Assistant Examiner*—Sara Addisu
(74) *Attorney, Agent, or Firm*—Womble Carlyle

(57) ABSTRACT

A cutting insert for grooving operations includes an elongated clamping portion and a cutting portion. The cutting portion has a chip rake surface and a relief surface meeting at a cutting edge. The relief surface has a plurality of recesses extending to the chip rake surface. In a top view of the cutting insert the cutting edge has the form of a serrated curved cutting edge.

13 Claims, 2 Drawing Sheets

GROOVING CUTTING INSERT HAVING A CIRCULAR CUTTING EDGE PROVIDED WITH RELIEF RECESSES

FIELD OF THE INVENTION

The present invention relates to a cutting insert for rough grooving machining operations of metallic workpieces.

BACKGROUND OF THE INVENTION

Rough machining operations of metallic workpieces may be effectively performed using cutting tools having cutting inserts with serrated cutting edges. Cutting inserts with serrated cutting edges enable higher metal removal, rates as compared with cutting inserts having non-serrated cutting edges. However, this is achieved at the expense of rougher surface finish. Cutting inserts with serrated cutting edges for milling operations are well known in the art. Triangular, square, round, and rectangular shaped cutting inserts are disclosed, respectively, in U.S. Pat. No. 3,574,911; U.S. Pat. No. 3,636,602; U.S. Pat. No. 3,922,766; and U.S. Pat. No. 4,936,714.

For rough grooving machining operations, grooving inserts with circular cutting edges may be used. Grooving inserts with circular cutting edges are disclosed, for example, in U.S. Pat. No. 6,796,752; U.S. Pat. No. 5,205,680; U.S. Pat. No. 4,844,668 and U.S. Pat. No. 3,705,447. However, it is believed that many of the existing cutting inserts do not adequately deal with chip control, especially in deep grooving operations. Chips removed from the workpiece may be relatively long which makes their evacuation from the groove difficult and consequently makes the grooving operation inefficient. Moreover, inadequate chip control can adversely affect the life of the cutting insert and can also damage the workpiece. The result can be both inconvenient and costly.

SUMMARY OF THE INVENTION

In accordance with the present invention there is provided a grooving cutting insert having an elongated form with a longitudinal axis and comprising an elongated clamping portion and at least one cutting portion, the at least one cutting portion having a first width transverse to the longitudinal axis, the clamping portion having a second width transverse to the longitudinal axis, the first width being greater than the second width, the at least one cutting portion having a chip rake surface and a relief surface meeting at an intersection, the relief surface having a plurality of recesses formed therein, the plurality of recesses extending to and opening out to the chip rake surface, the relief surface and the chip rake surface intersect at a cutting edge, wherein in a top view of the cutting insert the cutting edge has the form of a serrated curved cutting edge with recessed and non-recessed cutting edge portions.

In accordance with a preferred embodiment, at least two non-recessed cutting edge portions each have a section laying on an imaginary curve.

In accordance with a preferred embodiment, the imaginary curve is a imaginary circle.

Also in accordance with a preferred embodiment, all the non-recessed cutting edge portions each have a section laying the imaginary circle.

Further in accordance with a preferred embodiment, in a top view of the cutting insert the imaginary circle has a center that coincides with the longitudinal axis.

In accordance with a preferred embodiment, the first and second widths are measured transverse to the longitudinal axis in a top view of the cutting insert.

The present invention can provide a cutting insert for rough grooving machining operations of metallic workpieces that produces efficiently manageable short chips. Chip evacuation can thus potentially be made easy and safe even in deep grooving operations.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
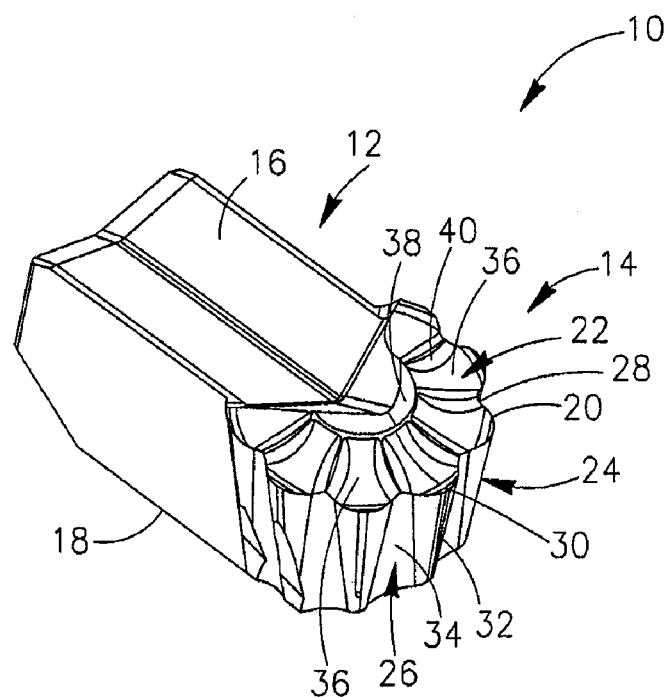
FIG. 1 is a top perspective view of a cutting insert according to the present invention.

Referring to the drawings, the elongated cutting insert 10 has an elongated clamping portion 12 and a cutting portion 14 formed integrally with the clamping portion 12. The cutting insert 10 has a longitudinal axis L and is typically made of extremely hard and wear-resistant material such as cemented carbide, either by form-pressing and sintering carbide powders in a binder or by powder injection molding methods. The clamping portion 12 has upper and lower clamping surfaces 16, 18 which are of concave V-shaped construction. The cutting portion 14 has a first width W1 and the clamping portion has a second width W2. The first and second widths W1, W2 being measured transverse to the longitudinal axis L in a top view of the cutting insert 10. The first width W1 is greater than the second width W2. The overall geometry of the cutting insert 10 is typical of cutting inserts used for grooving operations. The groove formed in the workpiece being machined will have a width equal to the first width W1. The clamping portion 12 of the cutting insert 10 is clamped in a clamping section of an insert holder (not shown) having a width similar to that of the clamping portion 12. Since the second width W2 is less than the first width W1 the cutting insert 10 can to progress into the groove being machined in the workpiece without the clamping portion 12 contacting the walls of the groove.

The cutting portion 14 has a cutting edge 20 formed at the intersection of a chip rake surface 22 and a relief surface 24. The relief surface 24 is oriented at a relief angle α to a workpiece being machined. The relief angle α may vary along the cutting edge 20. Formed in the relief surface 24 are elongated recesses 26 that extend and open out to the chip rake surface 22. In a top view (see FIG. 2) of the cutting insert 10 the cutting edge 20 has the form of a serrated, or wavy, circular cutting edge with recessed and non-recessed cutting edge portions 28, 30. Similarly, the relief surface 24 is wavy in form, comprising crests 32 and troughs 34, where each crest 32 intersects the chip rake surface 22 at an associated non-recessed cutting edge portion 30 and each trough 34 intersects the chip rake surface 22 at an associated recessed cutting edge portion 28.

An outermost section 30' of each non-recessed cutting edge portion 30 lies on an imaginary curve C. In accordance with a preferred embodiment, the imaginary curve C is a circle having a center O that, in a top view of the cutting insert 10, coincides with the longitudinal axis L. The recessed cutting edge portions 28 are radially closer to the center O than are the non-recessed cutting edge portions 30.

Figure 2:
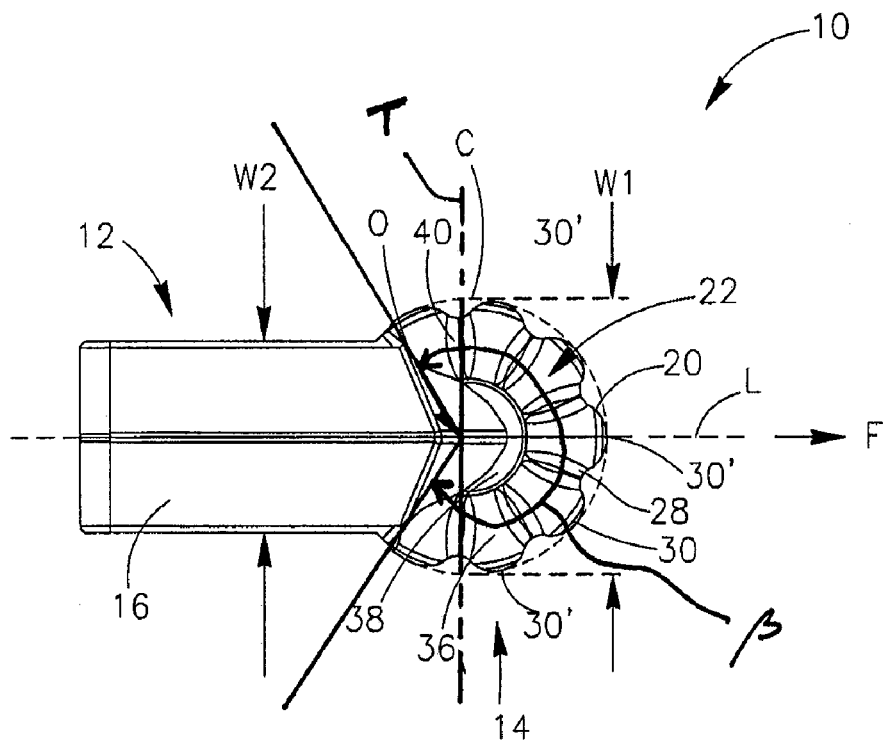
FIG. 2 is a top view of a cutting insert shown in FIG. 1.

As seen in the top view of FIG. 2, the chip rake surface 22 extends on both sides of a transverse axis T which is perpendicular to the longitudinal axis L and passes through the center O of the imaginary curve C. Thus, chip rake surface 22 subtends a circumferential angle $\beta$ that is not less than 180° about the center O.

Figure 3:
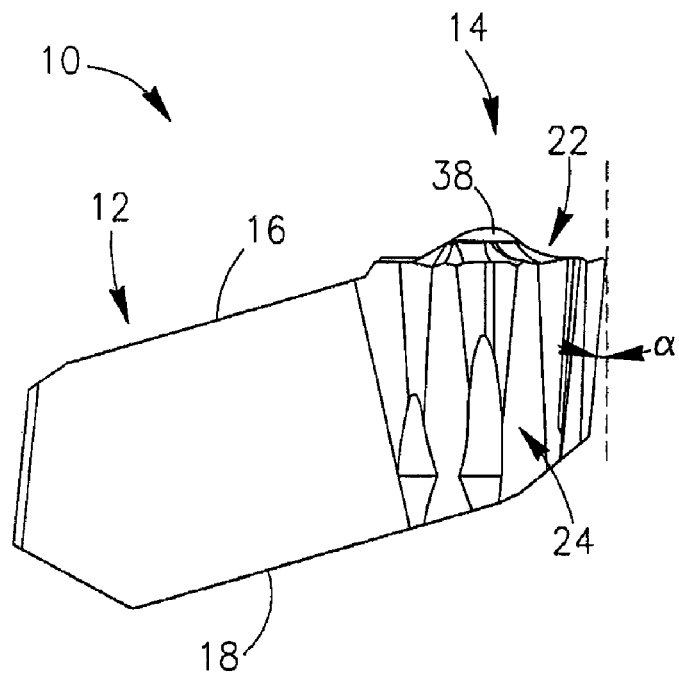
FIG. 3 is a side view of a cutting insert shown in FIG. 1.
Figure 4:
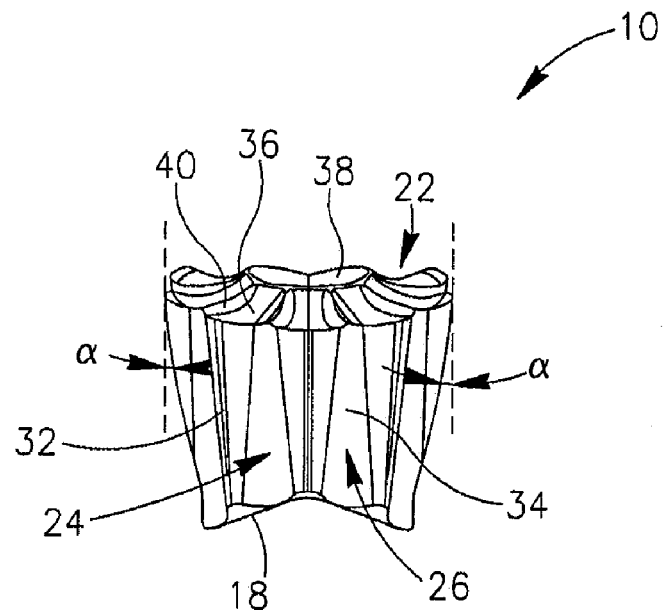
FIG. 4 is a front view of a cutting insert shown in FIG. 1.

The chip rake surface 22 is provided with radially directed depressions 36, each depression 36 extending from an associated non-recessed cutting edge portion 30 to a generally centrally located raised portion 38 of the chip rake surface 22. As best seen in FIG. 3, in a side view of the cutting insert, the raised portion 38 constitutes the highest portion of the cutting insert 10. An elevated rib 40 extends from each recessed cutting edge portion 28 to the raised portion 38 of the chip rake surface 22.

Although the present invention has been described to a certain degree of particularity, it should be understood that various alterations and modifications could be made without departing from the scope of the invention as hereinafter claimed.

What is claimed is:

1. A grooving cutting insert (10) having an elongated form with a longitudinal axis (L) and comprising an elongated clamping portion (12) and at least one cutting portion (14), the at least one cutting portion (14) having a first width transverse (W1) to the longitudinal axis (L), the clamping portion (12) having a second width (W2) transverse to the longitudinal axis (L), the first width (W1) being greater than the second width (W2), the at least one cutting portion (14) having a chip rake surface (22) and a relief surface (24) meeting at an intersection, the relief surface (24) having a plurality of recesses (26) formed therein, the plurality of recesses (26) extending to and opening out to the chip rake surface (22), the relief surface (24) and the chip rake surface (22) intersect at a cutting edge (20), wherein in a top view of the cutting insert (10) the cutting edge (20) has the form of a serrated curved cutting edge (20) with recessed and non-recessed cutting edge portions (28, 30).

2. The grooving cutting insert according to claim 1, wherein at least two non-recessed cutting edge portions (30) each have a section (30') laying on an imaginary curve (C).

3. The grooving cutting insert according to claim 2, wherein the imaginary curve (C) is an imaginary circle (C).

4. The grooving cutting insert according to claim 3, wherein all the non-recessed cutting edge portions (30) each have a section (30') laying the imaginary circle (C).

5. The grooving cutting insert according to claim 4, wherein in a top view of the cutting insert (10) the imaginary circle (C) has a center (O) that coincides with the longitudinal axis (L).

6. The grooving cutting insert according to claim 1, wherein the first and second widths (W1, W2) are measured transverse to the longitudinal axis (L) in a top view of the cutting insert (10).

7. The grooving cutting insert according to claim 1, wherein:

in a top view of the cutting insert, a plurality of the non-recessed cutting edge portions (30) each have a section (30') laying on an imaginary curve (C), the imaginary curve (C) having a center (O); and the chip rake surface (22) subtends a circumferential angle ($\beta$) of not less than 180°, about said center (O).

8. The grooving cutting insert according to claim 1, wherein:

the chip rake surface (22) is provided with radially directed depressions (36), each depression (36) extending from an associated non-recessed cutting edge portion (30) to a generally centrally located raised portion (38) of the chip rake surface (22); and the generally centrally located raised portion (38), in a side view of the cutting insert, constitutes the highest portion of the cutting insert.

9. A grooving cutting insert (10) having an elongated form with a longitudinal axis (L) and comprising an elongated clamping portion (12) and at least one cutting portion (14), the at least one cutting portion (14) having a first width transverse (W1) to the longitudinal axis (L), the clamping portion (12) having a second width (W2) transverse to the longitudinal axis (L), the first width (W1) being greater than the second width (W2), the at least one cutting portion (14) having a chip rake surface (22) and a relief surface (24) intersecting at a cutting edge (20); wherein in a top view of the cutting insert (10):

the cutting edge (20) has the form of a serrated curved cutting edge (20) with recessed and non-recessed cutting edge portions (28, 30);

a plurality of the non-recessed cutting edge portions (30) each have a section (30') laying on an imaginary curve (C); and the chip rake surface (22) subtends a circumferential angle ($\beta$) of not less than 180° along said imaginary curve.

10. The grooving cutting insert according to claim 9, wherein:

the imaginary curve (C) is a circle having a center (O); and the chip rake surface (22) subtends said circumferential angle ($\beta$) about said center (O).

11. The grooving cutting insert according to claim 10, wherein:

in a top view thereof, said center (O) coincides with the longitudinal axis (L).

12. The grooving cutting insert according to claim 9, wherein:

the relief surface (24) has a plurality of recesses (26) formed therein, the plurality of recesses (26) extending to and opening out to the chip rake surface (22).

13. The grooving cutting insert according to claim 9, wherein:

the chip rake surface (22) is provided with radially directed depressions (36), each depression (36) extending from an associated non-recessed cutting edge portion (30) to a generally centrally located raised portion (38) of the chip rake surface (22); and the generally centrally located raised portion (38), in a side view of the cutting insert, constitutes the highest portion of the cutting insert.

* * * * *